(12) United States Patent
Dolgunov et al.

(10) Patent No.: US 8,266,446 B2
(45) Date of Patent: Sep. 11, 2012

(54) SOFTWARE PROTECTION AGAINST FAULT ATTACKS

(75) Inventors: Boris Dolgunov, Ramat Gan (IL); Arseniy Aharonov, Arad (IL); Raphael Slepon Ben-Yaish, Petah Tikva (IL)

(73) Assignee: SanDisk IL Ltd., Kfar Saba (IL)

( * ) Notice: Subject to any disclaimer, the term of this patent is extended or adjusted under 35 U.S.C. 154(b) by 852 days.

(21) Appl. No.: 12/253,394

(22) Filed: Oct. 17, 2008

(65) Prior Publication Data

US 2009/0113214 A1    Apr. 30, 2009

(30) Foreign Application Priority Data

Oct. 30, 2007    (IL) .......................................... 187045

(51) Int. Cl.
  *G06F 12/14*    (2006.01)
(52) U.S. Cl. ................................. 713/189; 726/2; 726/4
(58) Field of Classification Search .................. 713/189; 726/1–36
  See application file for complete search history.

(56) References Cited

U.S. PATENT DOCUMENTS

| | | | |
|---|---|---|---|
| 4,960,982 A | 10/1990 | Takahira | |
| 6,144,740 A | 11/2000 | Laih et al. | |
| 6,539,092 B1 | 3/2003 | Kocher | |
| 7,430,671 B2 * | 9/2008 | Graves et al. ................ | 713/193 |
| 7,590,864 B2 * | 9/2009 | Khan et al. .................... | 713/189 |
| 7,598,842 B2 * | 10/2009 | Landram et al. ............. | 340/5.73 |
| 7,721,325 B2 * | 5/2010 | Lee et al. .......................... | 726/4 |
| 2004/0125950 A1 | 7/2004 | Yen et al. | |
| 2005/0132186 A1 | 6/2005 | Khan et al. | |
| 2005/0210280 A1 | 9/2005 | Paatero | |
| 2005/0282530 A1 * | 12/2005 | Raff .............................. | 455/418 |
| 2007/0180539 A1 * | 8/2007 | Holtzman et al. ............... | 726/34 |
| 2009/0282263 A1 * | 11/2009 | Khan et al. .................... | 713/189 |

FOREIGN PATENT DOCUMENTS

| | | |
|---|---|---|
| WO | WO-02/01368 | 1/2002 |
| WO | WO-2005091109 | 9/2005 |

OTHER PUBLICATIONS

Cynthia E. Irvine, Karl Levitt; Trusted Hardware: Can It Be Trustworthy?; Jun. 4-8, 2007; IEEE, pp. 14.*
Jason Waddle, et al., "Fault Attacks on Dual-Rail Encoded Systems" Proceedings of the 21st Annual Computer Security Applications Conference pp. 483-494 (2005).
International Search Report and Written Opinion for PCT/IL2008/001393, dated Feb. 13, 2009, 12 pages.
International Preliminary Report on Patentability for PCT/IL2008/001393, dated May 14, 2010, 7 pages.

* cited by examiner

*Primary Examiner* — Christopher J. Brown
*Assistant Examiner* — Fahimeh Mohammadi
(74) *Attorney, Agent, or Firm* — Brinks Hofer Gilson & Lione

(57) ABSTRACT

A method for protecting information in a device includes providing a device with a non-secure hardware domain, a processor having a software-controlled mode of operation, and a secure hardware domain having a secure memory that is inaccessible by the processor when the processor is operating in the software-controlled mode of operation. Data from the non-secure hardware domain is established in the secure hardware domain. Computing operations are executed on the data in the secure hardware domain to produce a result. The secure hardware domain is purged, while retaining the result therein. The result is thereafter returned from the secure hardware domain into the non-secure hardware domain.

8 Claims, 3 Drawing Sheets

SOFTWARE PROTECTION AGAINST FAULT ATTACKS

BACKGROUND OF THE INVENTION

1. Field of the Invention

This invention relates to securing data on a computing device. More particularly, this invention relates to prevention of fault attacks that could lead to unauthorized access to information or information protection features on a computing device.

2. Description of the Related Art

Embedded security refers to security features built into a device, including physical tamper-resistance features, cryptographic keys and algorithms. Embedded security features can be found today on a variety of computing devices, e.g., personal computers and servers, cellular telephones, set-top boxes, and many appliances. The present invention is largely concerned with protection of data generally, and cryptographic keys in particular. The meanings of several acronyms used in this disclosure are given in Table 1.

TABLE 1

| Acronyms and Abbreviations | |
|---|---|
| AES | Advanced Encryption Standard |
| CPU | Central Processing Unit |
| DES | Data Encryption Standarde |
| DH | Diffie-Hellman |
| ECC | Elliptic Curve Cryptography |
| ECDH | Elliptic Curve Diffie-Hellman |
| ECDSS | Elliptic Curve Algorithm with Digital Signature Standard |
| MPU | Memory Protection Unit |
| PKI | Public Key Infrastructure |
| RSA | Rivest, Shamir, & Adleman |

SUMMARY OF THE INVENTION

The above-noted and other computing devices that process encrypted data are potentially compromised by fault attacks, which are defined in further detail below. These attacks are active forms of side channel attacks that involve creation of some fault during the operation of the device being attacked and observation of the result. The faults result in an erroneous computation. Should the computation involve the use of a cryptographic key, comparison between the correct and flawed data may allow information about the key to be extracted. Alternatively, the analysis of the difference in behavior between the flawed device and a normal device can be exploited.

Fault attacks can penetrate modern encryption and decryption systems. For example, fault attacks have recovered cryptographic keys from systems using elliptic curve encryption, RSA and AES algorithms.

During the past ten years many types of fault attacks have been devised. They can be created by a variety of physical effects, e.g., heat, radiation, power variations, optical energy, electromagnetic fields, and mechanical disturbances.

According to disclosed embodiments of the invention, methods and systems are provided for coordinating data processing activities that occur in a non-secure hardware domain with cryptographic operations relating to the data processing that occur in a secure hardware domain as a countermeasure to fault attacks. While the cryptographic operations are occurring, the secure hardware domain is isolated from the non-secure hardware domain and its data, including intermediate computations, and its internal states are inaccessible from the non-secure hardware domain and inaccessible to inquiries from external sources.

Prior to returning a result of cryptographic operations from the secure hardware domain to the non-secure hardware domain, memory in the secure hardware domain is purged, except for the result itself, and internal states within the secure hardware domain are reset. Thereafter, the results are returned to the non-secure hardware domain. The cryptographic operations are impervious to fault attacks that could compromise a private cryptographic key.

An embodiment of the invention provides a method for protecting information in a device, which is carried out by providing a device with a non-secure hardware domain having data stored therein and including a software-controlled processor. The device has a secure hardware domain that includes a secure memory that is inaccessible by the processor when the processor is operating under software control. The method is further carried out by establishing the data in the secure hardware domain, executing computing operations on the data in the secure hardware domain to produce a result, purging the secure hardware domain by deleting data while retaining the final result, and thereafter returning the result from the secure hardware domain into the non-secure hardware domain.

According to one aspect of the method, the data includes a cryptographic key, and the computing operations comprise applying the cryptographic key to the data for encryption or decryption thereof.

According to aspect of the method, purging includes deleting the cryptographic key from the secure hardware domain.

According to yet another aspect of the method, executing computing operations is performed by a hardware accelerator.

In still another aspect of the method, the secure hardware domain includes a random access memory, wherein establishing data includes storing the data therein and the random access memory stores intermediate results of the computing operations, and purging includes deleting the intermediate results.

Other embodiments of the invention provide computer software product and apparatus for carrying out the above-described method.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein.

DETAILED DESCRIPTION OF THE INVENTION

In the following description, numerous specific details are set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code, which embodies aspects of the present invention, is typically maintained in permanent storage, such as a computer readable medium. In a client/server environment, such software programming code may be stored on a client or a server. The software programming code may be embodied on any of a variety of known tangible media for use with a data processing system, such as a diskette, or hard drive, or CD-ROM. The code may be distributed on such media, or may be distributed to users from the memory or storage of one computer system over a network of some type to other computer systems for use by users of such other systems.

Overview

Fault attacks produce an abnormal condition or defect at a component, system, or sub-system level, which may lead to a failure, improper functionality or data change. Usually these attacks are non-deterministic and limited. For example, in a non-deterministic register fault attack, an attacker is not able to obtain full control over a target device to set register bits, but may be able to change registers randomly.

In a limited fault attack, specific changes can be effected in the target device, but only in a limited manner. For example, the attacker may be unable to change values of a register to a desired state, but may be able to force all bits to "0" or to "1".

Such fault attack may create a change in bits of a device register at run time, for example while data are being unloaded to a user after completion of a cryptographic operation. Under these circumstances, analysis of the results in memory, together with intermediate calculation values may allow deduction of at least a portion of a private cryptographic key.

Embodiment 1

Figure 1:
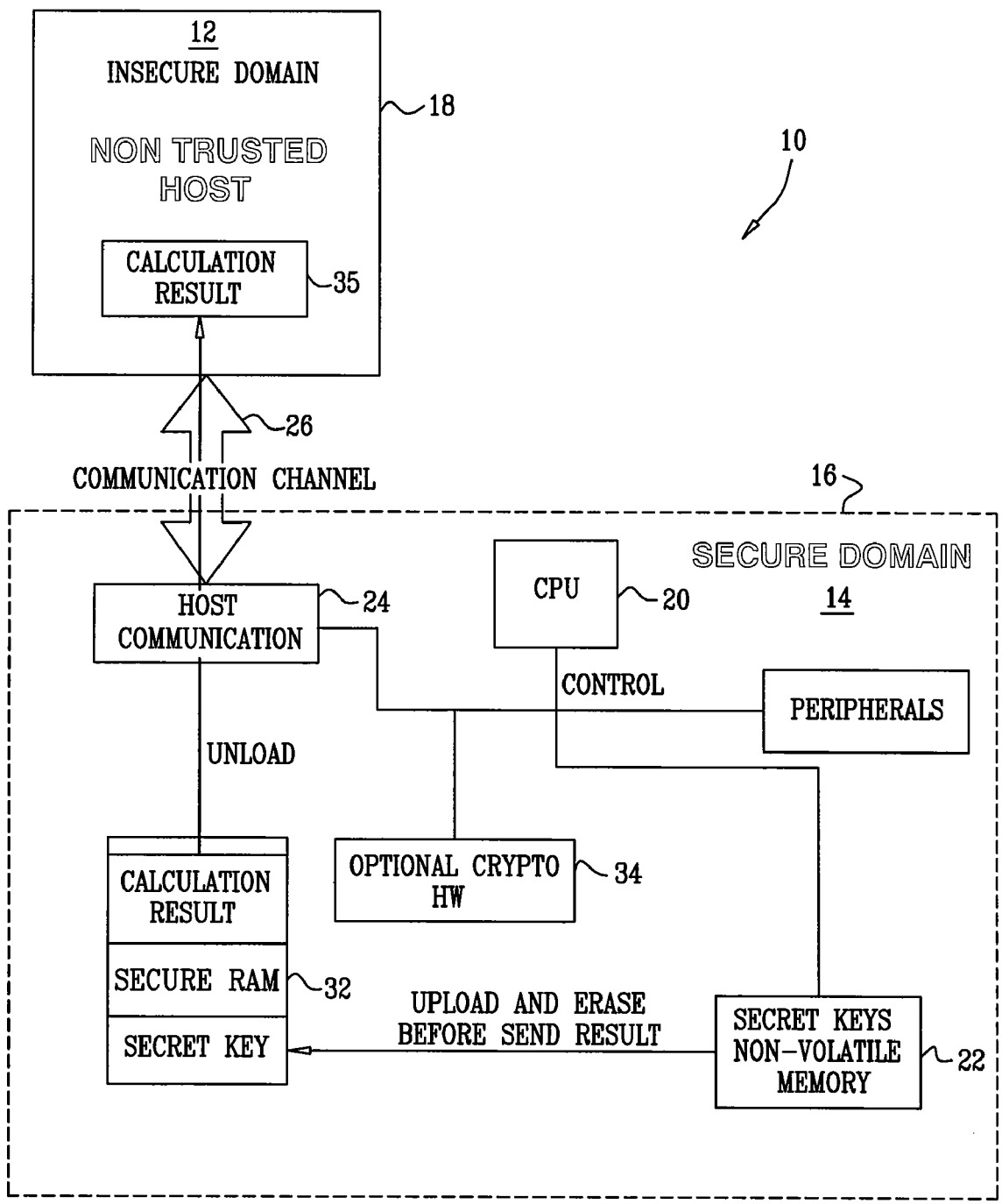
FIG. 1 is a block diagram of a generic data processing system that is constructed and operative in accordance with a disclosed embodiment of the invention.

Turning now to the drawings, reference is initially made to FIG. 1, which is a block diagram of a generic data processing system 10 that is constructed and operative in accordance with a disclosed embodiment of the invention. The architecture shown in FIG. 1 is exemplary. Many suitable variations will occur to those skilled in the art.

The system 10 is segmented into an insecure hardware domain 12 for general operations in accordance with the function of the device and a secure hardware domain, in which cryptographic operations occur. In this embodiment of the system 10, the domains 12, 14, may be realized as separate devices 16, 18, which can be linked via any suitable communications channel 26. For example, the device 16 may be a storage device, such as an information storage card, and the device 18 may be a microprocessor that is adapted to servicing the device 16. The devices 16, 18 need not even be physically connected, and can be at any distance from one another, so long as at least intermittent communication is possible in order to transfer data and control signals therebetween.

The device 16 includes a processing element, central processing unit 20, provided with suitable memory for carrying out normal processing functions. External communication in the domain 12 can occur via an I/O facility 24.

General data processing occurs in the domain 12, using the central processing unit 20 as is well known in the art. In the course of such data processing, it is necessary from time to time to decrypt or encrypt data. Private keys, held in a secure, non-volatile memory 22, and the subject data are placed in a secure memory 32. The memory 22 may be implemented as a separate circuit or chip that is incorporated in the secure hardware domain for use in cryptographic operations and verification of data. Cryptographic operations are then performed in the memory 32, optionally under control of a hardware accelerator 34, which can be actuated by the central processing unit 20. The hardware accelerator 34 may be a PKI accelerator that is adapted to known cryptographic algorithms, such as RSA, ECC, AES, and DES.

During cryptographic operations the central processing unit 20 has no access to the memory 32, nor to any internal registers (not shown) of the hardware accelerator 34. Thus, elements of the device 16 comprise the domain 14 and perform cryptographic operations in isolation, and the domain 14 is protected from access by non-trusted software that could exploit faults that may exist during the cryptographic operations. Upon completion of the cryptographic operations, private keys and intermediate computations in the memory 32 are erased, and results 35 are uploaded to the device 18. Details of the cryptographic operations are described below.

Embodiment 2

Figure 2:
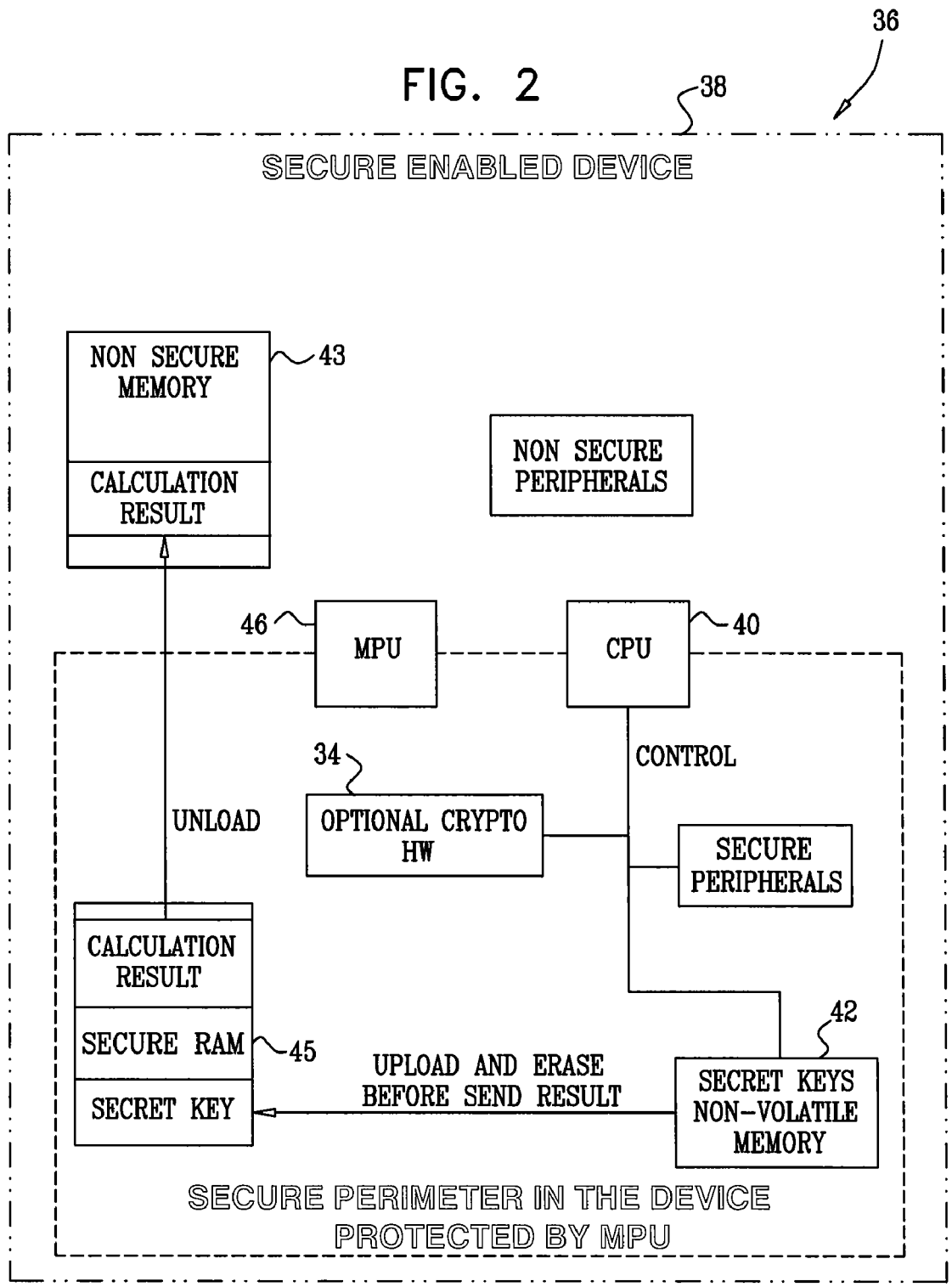
FIG. 2 is a block diagram of a generic data processing system that is constructed and operative in accordance with an alternative embodiment of the invention.

Reference is now made to FIG. 2, which is a block diagram of a data processing system 36 that is constructed and operative in accordance with an alternative embodiment of the invention. A non-secure hardware domain and a secure hardware domain are realized in a single computing device 38 that holds a central processing unit 40 and a non-volatile memory 42, which is used for storage of private cryptographic keys. Like the memory 22 (FIG. 1), the memory 42 may be implemented as a separate circuit or chip and incorporated in the secure hardware domain. A non-secure memory 43 is provided for general use by the central processing unit 40, including storage of results of cryptographic operations. A secure memory 45 is used for cryptographic operations. A memory protection unit 46 (MPU) is used to prohibit access by the central processing unit 40 to the secure memory 45 during cryptographic operations. The memory protection unit 46 can split the memory into multiple secure or trusted and non-secure or non-trusted domains to enable protection to be applied to a desired secure domain. Execution of cryptographic operations in the secure memory 45 is facilitated by optional hardware accelerator 34, as in Embodiment 1. The hardware accelerator 34 and secure memory 45 constitute a secure hardware domain, protected by the memory protection unit 46, while other elements of the device 38 form a non-secure hardware domain. In order to perform cryptographic operations, private keys are transferred from the memory 42 to the secure memory 45. Encrypted data are placed in the secure memory 45. As in Embodiment 1, and as explained in further detail below, the secure memory 45 is purged prior to transferring calculation results to the non-secure memory 43, which of course remains accessible to the central processing unit 40.

Operation

Figure 3:
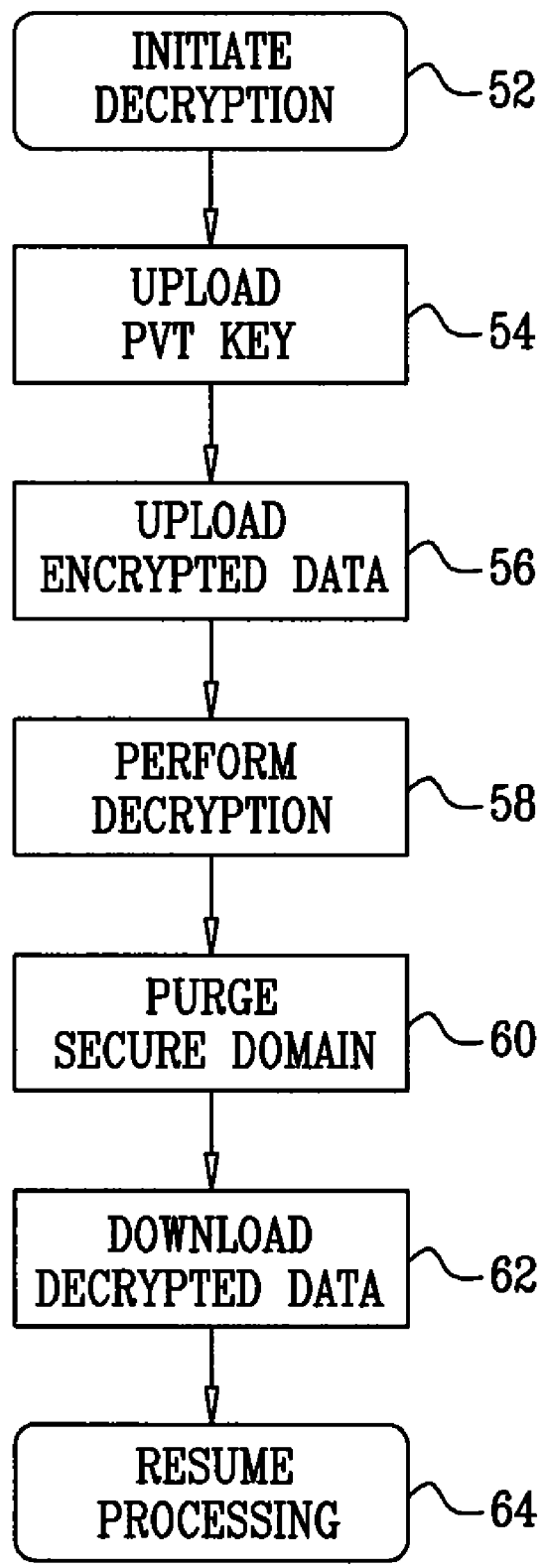
FIG. 3 is a flow chart of a method for performing fault attack-resistant cryptographic operations in a secure hardware domain, in accordance with a disclosed embodiment of the invention.

Reference is now made to FIG. 3, which is a flow chart of a method for performing a fault attack-resistant cryptographic operation in a secure hardware domain, in accordance with a disclosed embodiment of the invention. It is assumed that encrypted data and a private cryptographic key are available in a non-secure hardware domain. At initial step 52, an application requires data to be subjected to cryptographic operations. While decryption is presented by way of example, the method is also applicable, mutatis mutandis, to encrypt data.

Control now proceeds to step 54. The private cryptographic key is placed into the secure hardware domain, e.g., uploaded from the non-secure hardware domain to the secure hardware domain. Typically, step 54 is performed using a CPU in the non-secure hardware domain. A fault at this stage would be detected, as decryption would occur using an incorrect key, and the results would be evident in the subsequent program flow.

Step 56 begins after placing or uploading the private key into the secure hardware domain at step 54. Data to be decrypted is established in the secure hardware domain, e.g., by upload to the non-secure hardware domain, or by creating the secure hardware domain by controlling access to the memory holding the data, e.g., using a memory protection unit. A fault, such as a register fault, in the CPU at this stage would not result in revelation of any information concerning the private cryptographic key at this stage. The application may continue execution in other threads or respects without reference to the private cryptographic key while awaiting decryption to complete. Alternatively, the application may simply sleep or otherwise discontinue further progress until decryption is complete. All communication channels that would allow communication of data or control signals between the secure hardware domain and the non-secure hardware domain are now closed.

Next, at step 58, decryption of the data that was the subject of step 56 is performed by applying the private cryptographic key in accordance with the applicable algorithm. Operation in the secure hardware domain is particularly suitable for cryptographic algorithms having relatively long intermediate states, e.g., RSA, DH, DSS, ECDH, ECDSS and other PKI based algorithms. As noted above, step 58 may be done under the control of a hardware controller or a software module that, at least at this stage, lacks the ability to move data from the secure hardware domain to the non-secure hardware domain. In particular, the CPU, and thus the executing application, and external inquirers have no access to data or internal states within the secure hardware domain. The controller in the secure hardware domain sets its internal state in accordance with any parameters received in step 56. A fault at this stage at worst could produce an incorrect decryption, which would be detected.

After completion of step 58, at step 60 all information concerning the decryption of data in the memory of the secure hardware domain is purged, except that the final result is preserved. The purging function is unable to copy data. Similarly, any internal state registers in the controller are reset, so that their states bear no relation to the decryption. Any fault that may be present at this point cannot reveal any information regarding the private cryptographic key.

Next, at step 62, data communication channels between the secure hardware domain and the non-secure hardware domain are reopened, and the final result of the cryptographic operation in step 58 is unloaded or placed in the non-secure hardware domain. This step may involve a physical movement of data between the domains, or may be accomplished by the reestablishment of access to the data by elements in the non-secure hardware domain.

At final step 64 the application that required the decrypted data continues.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method for protecting information in a device, comprising the steps of:
   providing a device with a non-secure hardware domain, a processor having a software-controlled mode of operation, and a secure hardware domain having a secure memory that is inaccessible by said processor when said processor is operating in said software-controlled mode of operation;
   establishing data from the non-secure hardware domain in the secure hardware domain;
   executing computing operations on said data in said secure hardware domain to produce a result;
   purging said secure hardware domain while retaining said result therein; and
   thereafter returning said result from said secure hardware domain into said non-secure hardware domain.

2. The method according to claim 1, wherein purging comprises deleting said data from said secure hardware domain.

3. The method according to claim 1, wherein said data comprises a cryptographic key, wherein said computing operations comprise applying said cryptographic key to said data for encryption or decryption thereof.

4. The method according to claim 3, wherein purging comprises deleting said cryptographic key.

5. The method according to claim 1, wherein executing computing operations is performed by a hardware accelerator.

6. The method according to claim 1, wherein said secure hardware domain comprises a random access memory, wherein said step of establishing data comprises storing said data therein and said random access memory stores intermediate results of said computing operations, and said step of purging comprises deleting said intermediate results.

7. A method for protecting information in a device, comprising:
   providing a device with a non-secure hardware domain;
   providing a processor having a software-controlled mode of operation;
   providing a secure hardware domain having a secure memory that is inaccessible by the processor when the processor is operating in the software-controlled mode of operation;
   providing a controller operative to upload data to be protected from the non-secure hardware domain into the secure memory;
   executing, by the controller, computing operations on the data in the secure hardware domain to produce a result;
   deleting, by the controller, information from the secure memory while retaining the result therein; and
   unloading, by the controller, the result from the secure hardware domain into the non-secure hardware domain after deleting information from the secure memory while retaining the result therein.

8. A device comprising:
   a non-secure hardware domain;
   a processor configured to operate in a software-controlled mode of operation;
   a secure hardware domain comprising a secure memory that is inaccessible by the processor when the processor is operating in the software-controller mode of operation; and a controller configured to upload data to be protected from the non-secure hardware domain into the secure memory, the controller configured to:
  execute computing operations on the data in the secure hardware domain to produce a result;
  delete information from the secure memory while retaining the result therein; and
  unload the result from the secure hardware domain into the non-secure hardware domain after deleting information from the secure memory while retaining the result therein.

* * * * *